R. T. GRIFFITHS.
MIXING AND KNEADING MACHINE.
APPLICATION FILED MAR. 11, 1908.
912,842.
Patented Feb. 16, 1909.
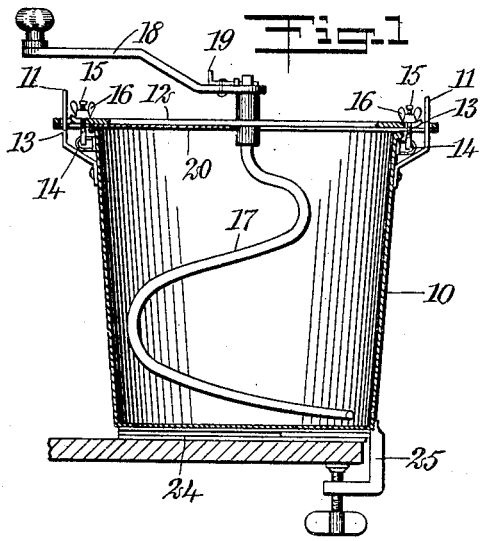
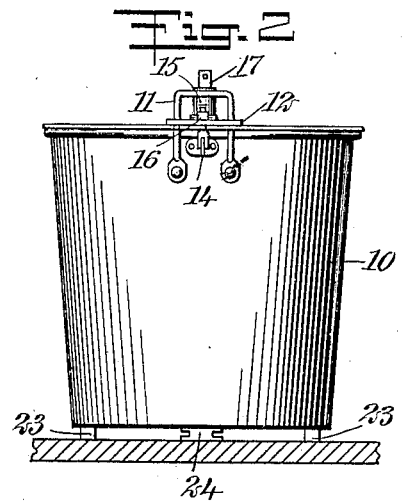
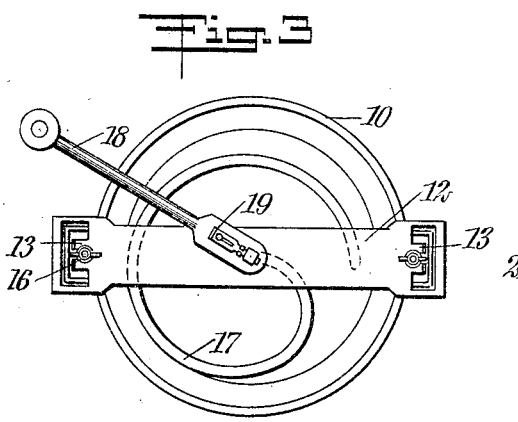
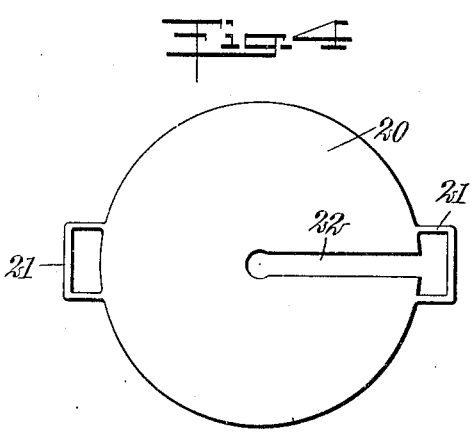
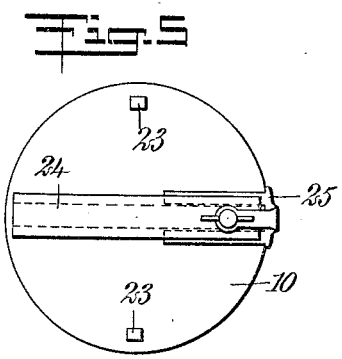
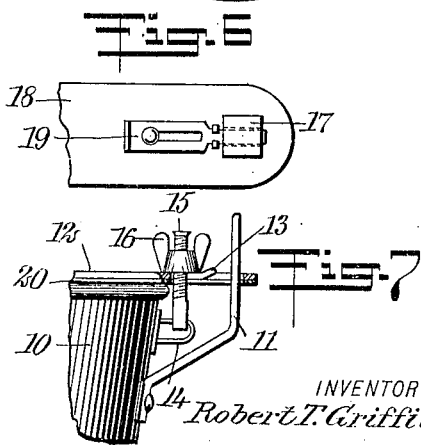
WITNESSES
INVENTOR
Robert T. Griffiths
BY
Munn & Co
ATTORNEYS

UNITED STATES PATENT OFFICE.

ROBERT T. GRIFFITHS, OF PITTSBURG, PENNSYLVANIA.

MIXING AND KNEADING MACHINE.

No. 912,842.  Specification of Letters Patent.  Patented Feb. 16, 1909.

Application filed March 11, 1908. Serial No. 420,425.

*To all whom it may concern:*

Be it known that I, ROBERT T. GRIFFITHS, a citizen of the United States, and a resident of Pittsburg, in the county of Allegheny and State of Pennsylvania, have invented a new and Improved Mixing and Kneading Machine, of which the following is a full, clear, and exact description.

This invention is an improvement in machines for mixing and kneading dough, and has in view a construction embodying a pail provided with handles, a cross-bar in which the mixing and kneading device is journaled, engaging with said handles and held against lateral movement thereby when seated on top of the pail, and means for binding the cross-bar to the top edge of the pail, holding it from displacement in a vertical direction; also to provide a crank in connection with the mixing and kneading device, having a slidable bolt adapted to be projected through an opening in the end of said device and detachably connecting these parts together, and further, to provide a cover for the pail designed to engage over the handles, and a U-shape clamp slidably connected to the under side of the pail for holding it in fixed position.

Reference is to be had to the accompanying drawings forming a part of this specification, in which similar characters of reference indicate corresponding parts in all the views.

Figure 1 is a central vertical section of my improved mixer and kneader as when secured to a fixed support by the clamping member; Fig. 2 is a side view of the machine, looking in a direction at right-angles to the showing in Fig. 1, with the clamp and crank detached; Fig. 3 is a plan of the machine with the cover detached; Fig. 4 is a plan of the cover; Fig. 5 is an inverted plan of the pail with the clamp applied; Fig. 6 is a view of the inner end of the crank detachably connected to the kneading and mixing device; and Fig. 7 is a fragmentary view of the pail, showing the means for retaining the cover and cross-bar in place, on an enlarged scale and partly in section.

In the construction of my improved apparatus for the mixing and kneading of dough for bread, cake, etc., I employ a pail 10 of any suitable construction, having offset handles 11 extending above the top edge of the pail at the opposite sides. Over these handles is adapted to be engaged a cross-bar 12, the outer ends of which are slotted for this purpose, as most clearly shown in Fig. 3, and provided with bifurcated tongues 13 projecting into these slots. Secured to the pail at the inside of the handles are staples 14, passing through eye-bolts 15, on which are threaded thumb-nuts 16. The eye-bolts 15 are preferably slightly up-set or headed at their extremities to prevent the removal of the nuts, and are adapted to pass within the bifurcations of the tongues 13 of the cross-bar 12 when the latter is engaged over the handles 11 and seated on the top edge of the pail. With the cross-bar in this position it is held against lateral movement by the handles and may not rise vertically from the pail when the thumb-nuts 16 are tightened, the engagement of the latter with the tongues being preferably insured by bending the extremities of the tongues slightly upward, as best shown in Fig. 7.

In the center of the cross-bar is journaled a mixing and kneading device 17, preferably of the well-known spiral form, and has detachably connected to its upper angular end a crank 18, the connection between the crank and mixing device being preferably effected by providing the crank with a sliding bolt 19 adapted to pass into an opening in the said device when the crank is in position and the bolt projected.

In addition to the cross-bar 12 there is adapted to be placed over the top of the pail a cover 20, as best shown in plan in Fig. 4, and which is provided with slotted extended portions or handles 21 adapted to engage over the handles 11; and further provided with a slot 22 passing from one of the handles or slotted portions for receiving the stem or spindle of the mixing device. This cover may be used in connection with the cross-bar 12, as illustrated in Fig. 1, and is generally employed when the dough is rising.

To the under side of the pail at suitable points are provided feet or projections 23 and an intermediate block 24 of approximately the same thickness and having grooves at opposite edges for receiving the upper slotted portion of a U-shape screw-clamp 25, thus serving to detachably connect these parts together, whereby the pail may be seated flat on any surface when the clamp is not in use.

It will be noted that by the particular mounting of the bolts 15 they may be swung down between the handles 11 when not in use, and will not interfere with the use of these handles in lifting the pail in the ordinary manner either when in operative or inoperative position.

Having thus described my invention, I claim as new and desire to secure by Letters Patent:

1. The combination of a pail having handles secured at opposite sides, a cross-bar adapted to be seated on the top of the pail, having slotted ends fitting over the handles and provided with bifurcated tongues projecting into the slots, bolts pivotally supported on the sides of the pail at the inside of the handles, having nuts and adapted to be passed into the bifurcations of the tongues and secure the cross-bar to the pail, and a mixing and kneading device journaled in the cross-bar.

2. The combination of a pail having handles secured at opposite sides and projecting above its top edge, a cross-bar having slotted opposite ends for receiving the handles, means carried by the pail independent of the handles for forcing the cross-bar thereto, and a mixing and kneading device journaled in the cross-bar.

3. The combination of a pail having handles secured at opposite sides and projecting above its top edge, a cover seated on the pail, having handles engaged over the handles of the pail, a cross-bar seated on the cover, engaging with the handles of the pail and having bifurcated tongues, bolts pivotally supported on the pail, having nuts and adapted to pass within the bifurcations of the tongues in securing the cross-bar to the pail, and a kneading and mixing device passing through the cover and journaled in the cross-bar.

4. The combination of a pail, a cross-bar adapted to be seated on the pail, having bifurcated tongues provided with upwardly-turned extremities, bolts pivotally supported at opposite sides of the pail, adapted to pass in the bifurcations of the tongues, nuts threaded on the bolts for engaging the tongues at the inside of their upwardly-turned extremities, and a kneading and mixing device journaled in the cross-bar.

5. The combination of a pail having mixing means and provided with feet on its under side, a block secured to the under side of the pail between said feet and approximately of the same thickness as the feet, and a U-shaped clamp slidable on said block for securing the pail in fixed position.

In testimony whereof I have signed my name to this specification in the presence of two subscribing witnesses.

ROBERT T. GRIFFITHS.

Witnesses:
EVELYN GRIFFITHS,
CATHARINE GRIFFITHS.